(12) United States Patent
Sun et al.

(10) Patent No.: US 10,550,537 B2
(45) Date of Patent: Feb. 4, 2020

(54) SELF-DRAINAGE ANCHOR CABLE SYSTEM FOR SLOPE PROTECTION AND CONSTRUCTION METHOD THEREOF

(71) Applicant: ZHEJIANG UNIVERSITY, Hangzhou, Zhejiang (CN)

(72) Inventors: Hongyue Sun, Zhejiang (CN); Yunhe Fan, Zhejiang (CN); Yuequan Shang, Zhejiang (CN); Lei Wang, Zhejiang (CN); Haodi Xu, Zhejiang (CN)

(73) Assignee: ZHEJIANG UNIVERSITY, Hangzhou, Zhejiang (CN)

( * ) Notice: Subject to any disclaimer, the term of this patent is extended or adjusted under 35 U.S.C. 154(b) by 0 days.

(21) Appl. No.: 16/300,956

(22) PCT Filed: Nov. 6, 2017

(86) PCT No.: PCT/CN2017/109457
§ 371 (c)(1),
(2) Date: Nov. 13, 2018

(87) PCT Pub. No.: WO2019/000775
PCT Pub. Date: Jan. 3, 2019

(65) Prior Publication Data
US 2019/0153697 A1   May 23, 2019

(30) Foreign Application Priority Data

Jun. 30, 2017 (CN) .......................... 2017 1 0529991

(51) Int. Cl.
*E02D 17/20* (2006.01)
*E02D 3/10* (2006.01)
*E02D 5/74* (2006.01)

(52) U.S. Cl.
CPC .............. *E02D 17/20* (2013.01); *E02D 3/10* (2013.01); *E02D 5/74* (2013.01)

(58) Field of Classification Search
CPC combination set(s) only.
See application file for complete search history.

(56) References Cited

U.S. PATENT DOCUMENTS

| | | | |
|---|---|---|---|
| 3,902,322 A * | 9/1975 | Watanabe | E02B 11/00 405/43 |
| 3,902,323 A * | 9/1975 | Watanabe | E02B 11/005 405/43 |
| 3,946,569 A * | 3/1976 | Stuber | E02D 5/80 405/303 |

(Continued)

*Primary Examiner* — Kyle Armstrong

(57) ABSTRACT

A self-drainage anchor cable system is provided, wherein a drainage section (15) is arranged above the internal anchoring section (14) of an anchor cable; a first end of the steel strand (2) extends into a bottom of the borehole (1); the isolation pipe (3) is sleeved on the steel strand (2) in the drainage section (15), and the permeable pipe (4) is sleeved on the isolation pipe (3); a length of the isolation pipe (3) is larger than a length of the permeable pipe (4), and there is a space (5) between the isolation pipe (3) and the permeable pipe (4); the water stop rings made of water-expanding rubber (6) are provided at both ends of the isolation pipe (3), and end portions of the permeable pipe (4) are in contact with the water-expending rubber water stop rings (6) A construction method for the self-drainage anchor cable system is also provided.

6 Claims, 1 Drawing Sheet location below the potential sliding surface

(56) References Cited

U.S. PATENT DOCUMENTS

| | | | |
|---|---|---|---|
| 7,628,565 B2* | 12/2009 | Melegari | E02B 11/005 405/43 |
| 2001/0004025 A1* | 6/2001 | Mocivnik | E21B 7/20 175/314 |
| 2004/0213636 A1* | 10/2004 | Russell | E02D 3/10 405/184.4 |
| 2008/0080931 A1* | 4/2008 | Melegari | E02D 3/10 405/43 |
| 2015/0191888 A1* | 7/2015 | Karsten | E02D 29/0233 405/262 |

* cited by examiner location below the potential sliding surface drain pipe fixing hole

A — A

SELF-DRAINAGE ANCHOR CABLE SYSTEM FOR SLOPE PROTECTION AND CONSTRUCTION METHOD THEREOF

CROSS REFERENCE OF RELATED APPLICATION

This is a U.S. National Stage under 35 U.S.C 371 of the International Application PCT/CN2017/109457, filed Nov. 6, 2017, which claims priority under 35 U.S.C. 119(a-d) to CN 201710529991.6, filed Jun. 30, 2017.

BACKGROUND OF THE PRESENT INVENTION

Field of Invention

The present invention relates to a geotechnical engineering field, and more particularly to a self-drainage anchor cable system for slope protection and a construction method thereof. The present invention is suitable for the disposal of slope disasters, and is especially suitable for slope engineering protection with rich groundwater.

Description of Related Arts

Anchor cable system is widely used due to characteristic of active support. The anchor cable reinforcement technology is not just passively applied in accident handling, and has become active prevention and control as part of the design content of the slope engineering. There are many types of anchor cables used in slope reinforcement projects, but the basic structures are similar, including an internal anchoring section, a free section and an external anchoring section. During the construction of the anchor cable, the internal anchoring section and the free section will be grouted and sealed. Due to the pressure grouting, not only the anchoring system is formed and the rock and soil are strengthened because the grout infiltrates into the gaps of the rock and soil, but also the groundwater seepage channel is blocked and permeability of the rock and soil is reduced, leading to a large increase in the groundwater level of the slope and landslide disaster. If the anchor system can achieve both the reinforcement of the slope and the reduction of the groundwater level of the slope, it can achieve twice the result with half the effort.

SUMMARY OF THE PRESENT INVENTION

For overcoming defects of conventional anchoring technologies, an object of the present invention is to provide a self-drainage anchor cable system for slope protection and a construction method thereof, wherein the self-drainage anchor cable system has both anchor cable reinforcement and borehole drainage to achieve multiple functions with one hole.

Accordingly, in order to accomplish the above objects, the present invention provides a self-drainage anchor cable system for slope protection, comprising: a borehole, a steel strand, an isolation pipe, a permeable pipe, water stop rings made of water-expanding rubber, a drain pipe, a protection pipe, cement mortar and external anchor head, wherein the borehole is drilled at a certain location of a slope; a depth of the borehole ensures an internal anchoring section is below a potential sliding surface; an anchor cable body is manufactured according to a designed anchor cable type and structure; a drainage section is arranged above the internal anchoring section of an anchor cable; a first end of the steel strand extends into a bottom of the borehole, and a second end of the steel strand is connected to the external anchor head; the isolation pipe is sleeved on the steel strand in the drainage section, and the permeable pipe is sleeved on the isolation pipe; a length of the isolation pipe is larger than a length of the permeable pipe, and there is a space between the isolation pipe and the permeable pipe; the water stop rings made of water-expanding rubber are provided at both ends of the isolation pipe, and end portions of the permeable pipe are in contact with the water-expending rubber water stop rings; holes are drilled on the water stop rings made of water-expanding rubber; a water inlet of the drain pipe passes through the holes of the water stop rings made of water-expanding rubber and extends into the space between the permeable pipe and the isolation pipe, so as to reach a bottom of the drainage section; a water outlet of the drain pipe is placed in rock and soil of the slope and extends to a safe zone which is below the slope, and an elevation of the safe zone is below the bottom of the borehole; a section of the drain pipe, which is buried in the slope, is covered with the protective pipe, so as to prevent the drain pipe from deformation by squeezing; the borehole is filled with the cement mortar except for the space outside the isolation pipe at the drainage section.

Preferably, the drain pipe is formed by at least one PA (polyamide) pipe with a diameter of 4 mm.

Preferably, the protection pipe and the isolation pipe are PC (polycarbonate) pipes.

Preferably, the permeable pipe is a corrugated pipe which is externally covered with filter cloth and internally supported by HDPE (high-density polyethylene).

Preferably, a length of the drainage section is 5-10 m according to permeability and water-richness of rock and soil of the slope, wherein a lower limit is selected for good permeability and poor water-richness, and an upper limited is selected for poor permeability and good water-richness.

Preferably, a diameter of the borehole is larger than 110 mm.

After installation of the entire system, the anchor cable provides an anchoring force to increase an anti-sliding force of the slope. The groundwater infiltrates into the space between the permeable pipe and the isolation pipe through the drainage section of the anchor cable, causing the water pressure in the space to rise. When a water head height of the water inlet of the drain pipe is greater than an elevation of the borehole, the groundwater in the space naturally flows out from the drain pipe, wherein the drainage process takes place, and the groundwater level of the slope decreases, so as to start a siphon drainage process and generate a negative pressure in the space of the drainage section, in such a manner that the groundwater in the slope accelerates into the drainage section; after draining the groundwater of the slope, in-taking air through the water inlet of the drain pipe, in such a manner that suction and discharge of the drain pipe disappears, and an entire drainage process ends; wherein with cycles of rainfall infiltration, the drainage process circulates.

Beneficial effects of the present invention are as follows:

(1) The present invention adopts a slope disaster control technology combining anchoring and drainage, and the borehole has the functions of anchoring and drainage, thereby substantially reducing engineering disposal construction cost.

(2) The drainage process circulates with the rainfall, and the discharge of the drain pipe undergoes periodic cyclical changes, realizing continuous drainage of a deep portion of the slope in real time, and solving a problem of drainage treatment of slope with rich water.

(3) The treatment process does not involve large-scale earthwork excavation, and the implementation process of the treatment project is simple and easy.

(4) The drainage measures have good reliability and strong applicability, and the drainage process requires no power and frequent management and maintenance.

(5) During the drainage process, the siphon action will create a negative pressure in the drainage section, forcing the surrounding rock groundwater to flow quickly to the space and out of the slope.

(6) Intermittent suction and drainage can take out fine soil particles in the borehole to prevent siltation of the drainage system.

Figure 1:
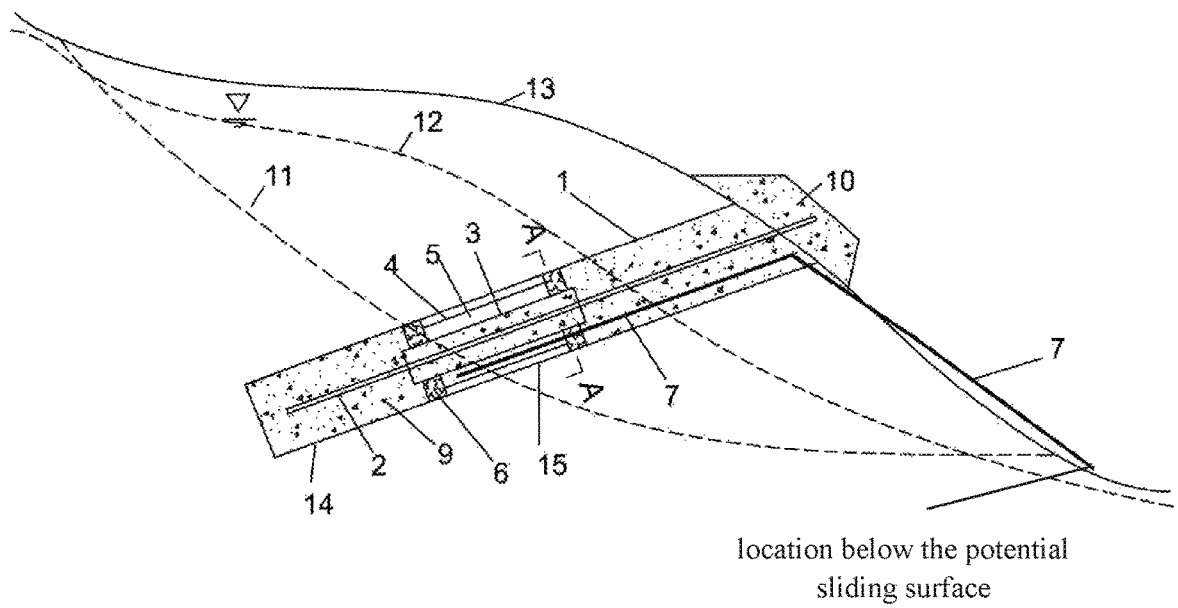
FIG. 1 is an overall structure view of a self-drainage anchor cable system of the present invention.
Figure 2:
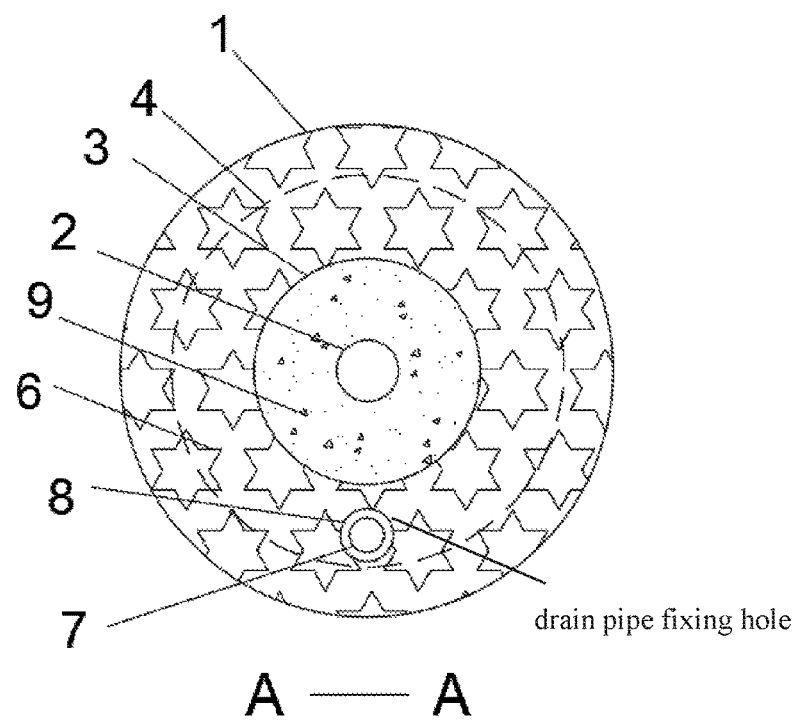
FIG. 2 is an A-A sectional view of FIG. 1.

Element reference: borehole 1, steel strand 2, isolation pipe 3, permeable pipe 4, space 5, water stop ring made of water-expanding rubber 6, drain pipe 7, protection pipe 8, cement mortar 9, external anchor head 10, potential sliding surface 11, underwater level line 12, slope 13, internal anchoring section 14, drainage section 15.

DETAILED DESCRIPTION OF THE PREFERRED EMBODIMENT

The present invention will be further illustrated below with embodiments. It is to be understood that the embodiments are merely illustrative of the present invention and are not intended to limit the scope of the present invention. In addition, it is to be understood that various modifications and changes may be made to the present invention, which are also within the claimed scope of the present invention.

Embodiment 1

Referring to FIG. 1, the embodiment 1 provides a self-drainage anchor cable system for slope protection, comprising: a borehole 1, a steel strand 2, an isolation pipe 3, a permeable pipe 4, water stop rings made of water-expanding rubber 6, a drain pipe 7, a protection pipe 8, cement mortar 9 and external anchor head 10, wherein the borehole 1 is drilled at a certain location of a slope 13; a depth of the borehole 1 ensures an internal anchoring section 14 is below a potential sliding surface 11; an anchor cable body is manufactured according to a designed anchor cable type and structure; a drainage section 15 is arranged above the internal anchoring section 14 of an anchor cable; a first end of the steel strand 2 extends into a bottom of the borehole 1, and a second end of the steel strand 2 is connected to the external anchor head 10; the isolation pipe 3 is sleeved on the steel strand 2 in the drainage section 15, and the permeable pipe 4 is sleeved on the isolation pipe 3; a length of the isolation pipe 3 is larger than a length of the permeable pipe 4, and there is a space 5 between the isolation pipe 3 and the permeable pipe 4; the water stop rings made of water-expanding rubber 6 are provided at both ends of the isolation pipe 3, and end portions of the permeable pipe 4 are in contact with the water-expending rubber water stop rings 6; there is the space 5 between the isolation pipe 3 and the permeable pipe 4, and the water stop rings made of water-expanding rubber 6 are provided at both the ends of the isolation pipe 3; holes are drilled on the water stop rings made of water-expanding rubber 6; a water inlet of the drain pipe 7 passes through the holes of the water stop rings made of water-expanding rubber 6 and extends into the space 5 between the permeable 4 pipe and the isolation pipe 3, so as to reach a bottom of the drainage section 15; a water outlet of the drain pipe 7 is placed in rock and soil of the slope 13 and extends to a safe zone which is below the slope 13, and an elevation of the safe zone is below the bottom of the borehole 1; a section of the drain pipe 7, which is buried in the slope, is covered with the protective pipe 8, so as to prevent the drain pipe 7 from deformation by squeezing; the borehole 1 is filled with the cement mortar 8 except for the space 5 outside the isolation pipe 3 at the drainage section 15.

The drain pipe 7 is formed by at least one PA (polyamide) pipe with an inner diameter of 4 mm.

The protection pipe 8 and the isolation pipe 3 are PC (polycarbonate) pipes.

The permeable pipe 4 is a corrugated pipe which is externally covered with filter cloth and internally supported by HDPE (high-density polyethylene).

A length of the drainage section 15 is 5-10 m according to permeability and water-richness of rock and soil of the slope, wherein a lower limit is selected for good permeability and poor water-richness, and an upper limited is selected for poor permeability and good water-richness.

After installation of the entire system, the anchor cable provides an anchoring force to increase an anti-sliding force of the slope. The groundwater infiltrates into the space between the permeable pipe and the isolation pipe through the drainage section of the anchor cable, causing the water pressure in the space to rise. When a groundwater level in the slope rises and a water head height of the water inlet of the drain pipe is greater than an elevation of the borehole, the groundwater in the space naturally flows out from the drain pipe, so as to naturally start siphoning for draining groundwater from the slope, and limit the rise of the groundwater level of the slope.

A construction method for the self-drainage anchor cable system, comprising steps of:

(1) through slope engineering geological condition investigation, analyzing a location of a potential sliding surface 11, a depth of a groundwater level of a slope 13 and a groundwater level line 12 to be controlled; and drilling a borehole 1 at an appropriate position of the slope 13 to enter a location below the potential sliding surface 11 and the groundwater level line 12;

(2) determining a diameter and a quantity of steel strands 2 according to an anchoring force required by an anchor cable;

(3) modifying a length of a permeable pipe 4 to equal a length of a drainage section 15, and modifying a length of an isolation pipe 3 to be 0.5 m larger than the length of the drainage section 15; sleeving both ends of the isolation pipe 3 with water stop rings made of water-expanding rubber 6, and sleeving the isolation pipe 3 with the permeable pipe 4, wherein end portions of the permeable pipe 4 are in contact with the water-expending rubber water stop rings 6;

(4) manufacturing an anchor cable body, and installing the isolation pipe 3 together with the permeable pipe 4 and the water stop rings made of water-expanding rubber 6 into the drainage section 15 above an internal anchoring section 14;

(5) sleeving the drain pipe 7 with a protection pipe 8, in such a manner that the drain pipe 7 passes through holes of the water stop rings made of water-expanding rubber 6 and extends into a space 5 between the permeable pipe 4 and the isolation pipe 3, and a water inlet of the drain pipe 7 is at a bottom of the drainage section 15;

(6) after the water stop rings made of water-expanding rubber 6 are fully expanded with water, filling the borehole 1 with cement mortar 9, and performing anchor cable tensioning and locking pre-stress; and (7) when a water head height of the water inlet of the drain pipe is greater than an elevation of the borehole, discharging groundwater by the drain pipe under a water head difference, wherein the drainage process takes place, and the groundwater level of the slope decreases, so as to start starts a siphon drainage process and generates a negative pressure in the space of the drainage section, in such a manner that the groundwater in the slope accelerates into the drainage section; after draining the groundwater of the slope, in-taking air through the water inlet of the drain pipe, in such a manner that suction and discharge of the drain pipe disappears, and an entire drainage process ends; wherein with cycles of rainfall infiltration, the drainage process circulates.

What is claimed is:

1. A self-drainage anchor cable system for slope protection, comprising: a borehole, a steel strand, an isolation pipe, a permeable pipe, water-expanding rubber water stop rings, a drain pipe, a protection pipe, cement mortar and external anchor head, wherein the borehole is drilled on a slope; a depth of the borehole ensures an internal anchoring section is below a potential sliding surface; a drainage section is arranged above the internal anchoring section of the self-drainage anchor cable system; a first end of the steel strand extends into a bottom of the borehole, and a second end of the steel strand is connected to the external anchor head; the isolation pipe is sleeved on the steel strand in the drainage section, and the permeable pipe is sleeved on the isolation pipe; a length of the isolation pipe is larger than a length of the permeable pipe, and there is a space between the isolation pipe and the permeable pipe; the water-expanding rubber water stop rings are provided at both ends of the isolation pipe, and end portions of the permeable pipe are in contact with the water-expending rubber water stop rings; drain pipe fixing holes are drilled on the water-expanding rubber water stop rings; a water inlet of the drain pipe passes through the drain pipe fixing holes of the water-expanding rubber water stop rings and extends into the space between the permeable pipe and the isolation pipe, so as to reach a bottom of the drainage section for draining; a water outlet of the drain pipe is placed below the potential sliding surface and below the bottom of the borehole; a section of the drain pipe, which is buried in the slope, is covered with the protective pipe; the borehole is filled with the cement mortar except for the space outside the isolation pipe at the drainage section.

2. The self-drainage anchor cable system, as recited in claim 1, wherein the drain pipe is formed by at least one PA (polyamide) pipe with a diameter of 4 mm; the protection pipe and the isolation pipe are PC (polycarbonate) pipes.

3. The self-drainage anchor cable system, as recited in claim 1, wherein the permeable pipe is a corrugated pipe which is externally covered with filter cloth and internally supported by HDPE (high-density polyethylene).

4. The self-drainage anchor cable system, as recited in claim 1, wherein a length of the drainage section is 5-10 mm according to permeability and water yield property of rock and soil of the slope, wherein a lower limit is selected for good permeability and poor water yield property, and an upper limited is selected for poor permeability and good water yield property.

5. The self-drainage anchor cable system, as recited in claim 1, wherein a diameter of the borehole is larger than 110 mm.

6. A construction method for a self-drainage anchor cable system, comprising steps of:
 (1) through slope engineering geological condition investigation, analyzing a location of a potential sliding surface, a depth of a groundwater level of a slope and a groundwater level line to be controlled; and drilling a borehole at the slope, wherein a bottom of the borehole is below the potential sliding surface and the groundwater level line;
 (2) determining a diameter and a quantity of steal strands according to an anchoring force required by the anchor cable system;
 (3) modifying a length of a permeable pipe to equal a length of a drainage section, and modifying a length of an isolation pipe to be larger than the length of the drainage section; sleeving both ends of the isolation pipe with water-expanding rubber water stop rings, and sleeving the isolation pipe with the permeable pipe, wherein end portions of the permeable pipe are in contact with the water-expanding rubber water stop rings;
 (4) manufacturing an anchor cable body, and installing the isolation pipe together with the permeable pipe and the water-expanding rubber water stop rings into the drainage section above an internal anchoring section;
 (5) sleeving the drain pipe with a protection pipe, in such a manner that the drain pipe passes through drain pipe fixing holes of the water-expanding rubber water stop rings and extends into a space between the permeable pipe and the isolation pipe, and a water inlet of the drain pipe is at a bottom of the drainage section;
 (6) after the water-expanding rubber water stop rings are fully expanded with water, filling the borehole with cement mortar, and performing anchor cable tensioning and locking pre-stress; and
 (7) when a water head height of the water inlet of the drain pipe is greater than an elevation of the borehole, discharging groundwater by the drain pipe under a water head difference, which starts a siphon drainage process and generates a negative pressure in the space of the drainage section, in such a manner that the groundwater in the slope accelerates into the drainage section; after draining the groundwater of the slope, in-taking air through the water inlet of the drain pipe, in such a manner that suction and discharge of the drain pipe disappears, and an entire drainage process ends; wherein with cycles of rainfall infiltration, the drainage process circulates.

* * * * *